No. 608,805. Patented Aug. 9, 1898.
J. H. TEMPLIN.
WIRE COIL MACHINE.
(Application filed Feb. 21, 1898.)
(No Model.) 3 Sheets—Sheet 2.

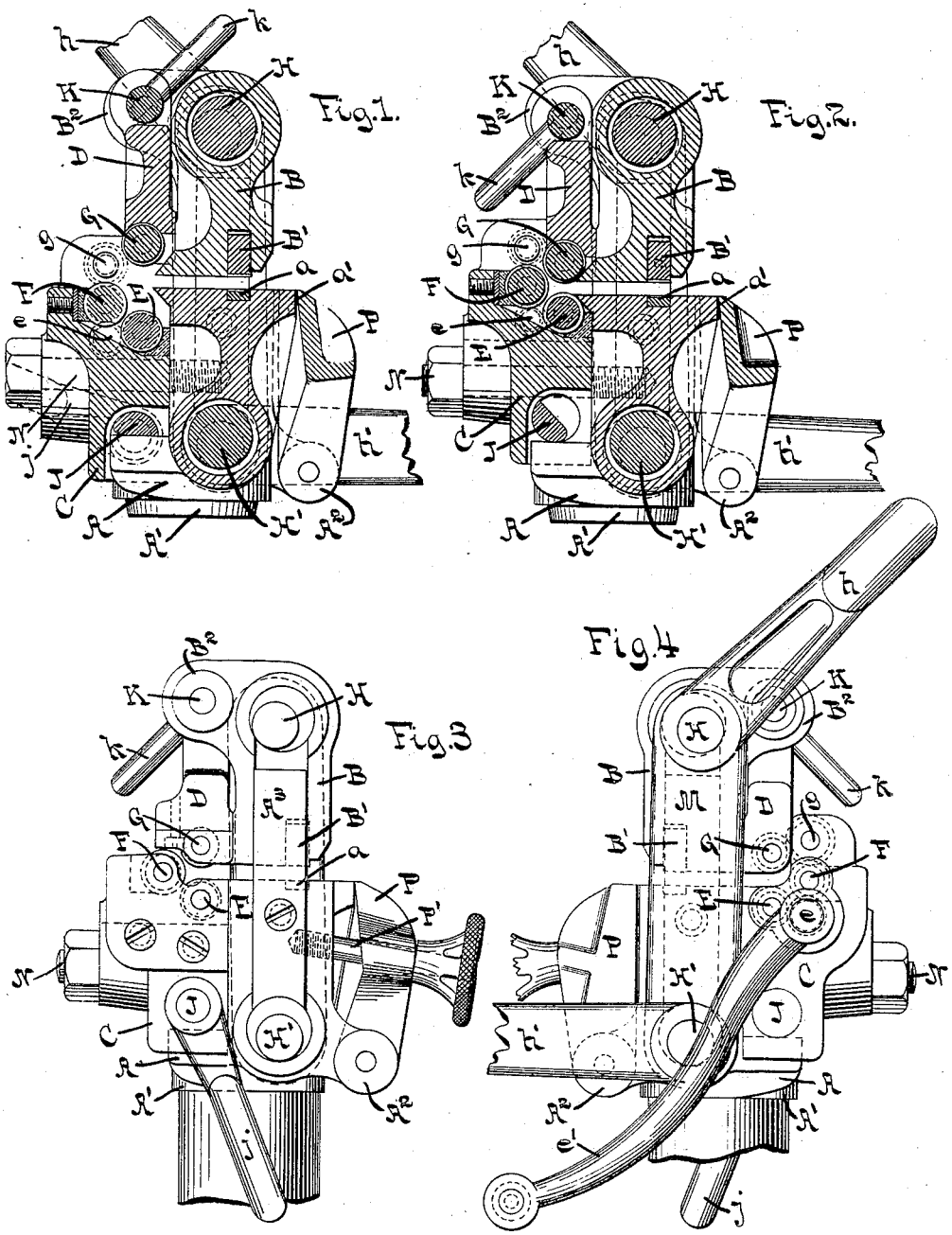

Witnesses. Inventor.
Joseph H. Templin.

Attorney.

No. 608,805. Patented Aug. 9, 1898.
J. H. TEMPLIN.
WIRE COIL MACHINE.
(Application filed Feb. 21, 1898.)
(No Model.) 3 Sheets—Sheet 3.
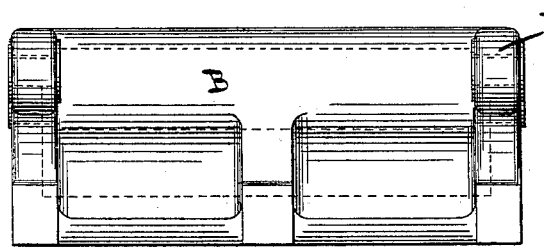
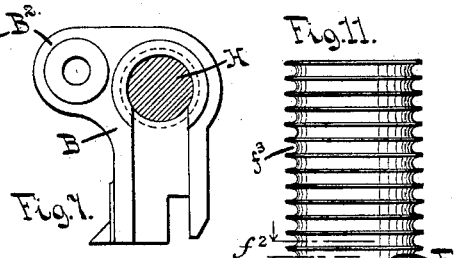
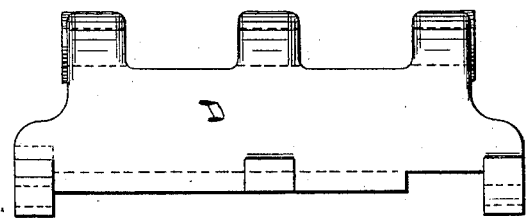
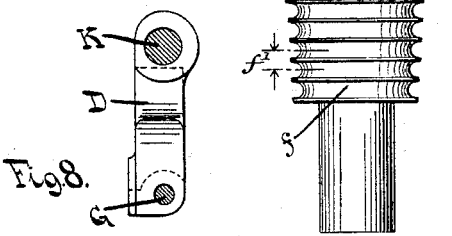
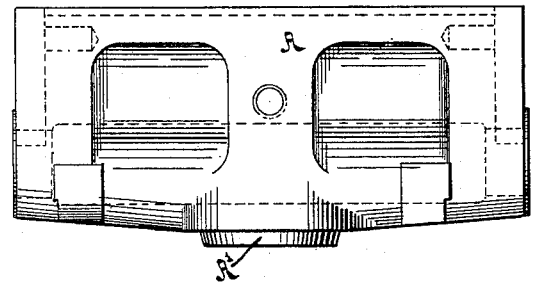
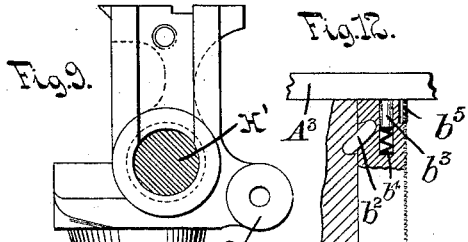
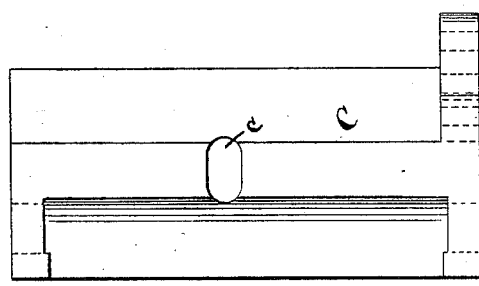
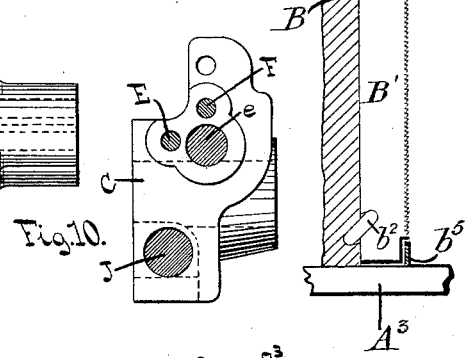
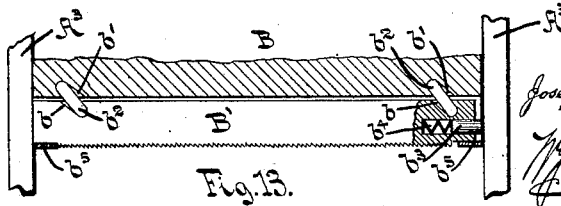
Witnesses.
Leslie Griscom
N. H. Pernstedt
Inventor.
Joseph H. Templin
by
Attorney.
THE NORRIS PETERS CO., PHOTO-LITHO., WASHINGTON, D. C.

UNITED STATES PATENT OFFICE.

JOSEPH H. TEMPLIN, OF BIRDSBOROUGH, PENNSYLVANIA, ASSIGNOR TO THE DIAMOND DRILL AND MACHINE COMPANY, INCORPORATED, OF SAME PLACE.

WIRE-COIL MACHINE.

SPECIFICATION forming part of Letters Patent No. 608,805, dated August 9, 1898.

Application filed February 21, 1898. Serial No. 671,085. (No model.)

*To all whom it may concern:*

Be it known that I, JOSEPH H. TEMPLIN, a citizen of the United States of America, and a resident of Birdsborough, county of Berks, State of Pennsylvania, have invented certain new and useful Improvements in Wire-Coil Machines, of which the following is a specification.

My invention relates particularly to that class of wire-coil machines in which the coiled wire is inserted into the edges of material for the purpose of uniting the same. In Patents Nos. 581,316 and 593,406 are shown machines of this class having certain features in common with my present construction. The improvements in the latter consist mainly, first, in providing in the same machine for either joint or independent closing of the coil-rolls and the clamping-jaws; second, in providing for different adjustments and movements of the coil-rolls; third, in providing, in connection with the clamping-jaws, a supplementary clamping device operating substantially at right angles to the clamping-jaws; fourth, in providing feed-grooves of varying pitch on the coil-rolls, whereby easy introduction of the coil is combined with a stiffening of the same by the feeding action.

These and additional novel features are fully described in connection with the accompanying drawings and are clearly pointed out in the claims.

Figure 5:
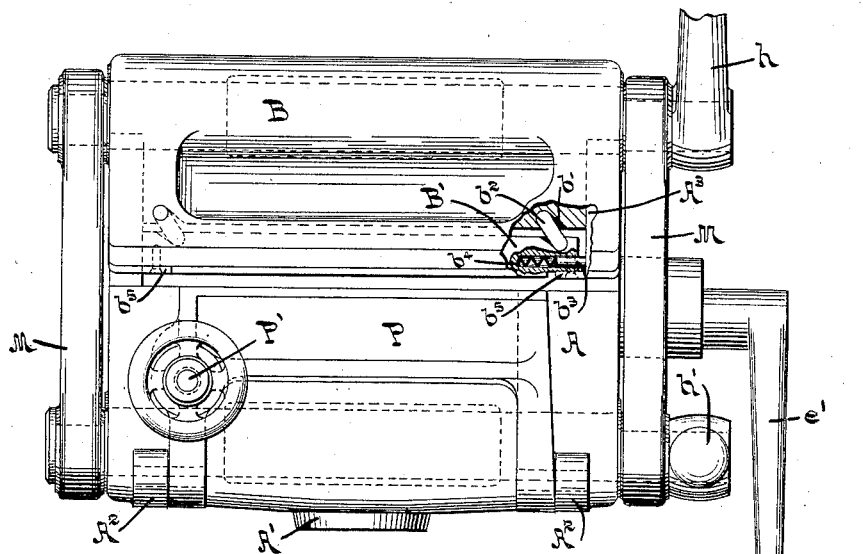
Figure 6:
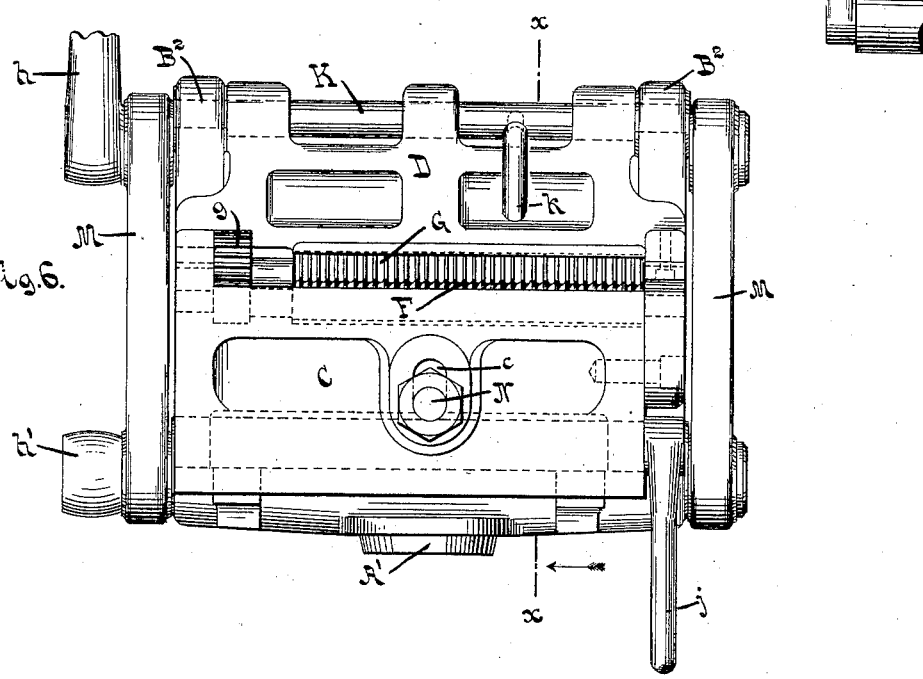

Figure 1 is a cross-sectional view of a machine embodying my improvements, taken on the line $xx$ of Fig. 6. Fig. 2 is a similar cross-section showing the rolls in different positions. Fig. 3 is an end elevation showing a link removed. Fig. 4 is a full opposite end view. Fig. 5 is a full front elevation, and Fig. 6 a full rear elevation, of the machine. Figs. 7 to 13 are detail views. Fig. 7 shows, in two views, the upper clamping-jaw; Fig. 8, the sliding frame D; Fig. 9, the lower clamping-jaw, and Fig. 10 the frame C. Fig. 11 is an enlarged view of the entering end of a coil-roll. Figs. 12 and 13 are partial sectional views showing the manner of connecting the movable face to the clamping-jaw.

A represents the main frame or bed of the machine, which may be supported at A' upon a convenient column. (Not shown.)

B is the movable clamping-jaw, which is carried above the frame A on a pair of end links M and which is guided vertically by upright extensions $A^3$, Fig. 5, from the frame A. The meeting portions of the fixed frame A and of the movable section B form, jointly, the clamping-jaws between which the material is held during the insertion of the coil and subsequently the coil flattened, as usual in this class of machine and as more fully referred to later.

The coil-rolls E F G are arranged triangularly and rotated in the same direction, as usual, by means of suitable gearing, including idlers $e$ and $g$. As shown, the lower roll E and intermediate roll F, together with the idlers $e$ and $g$, are mounted in a vertically-movable frame C, suitably guided and adjustably clamped by means of a bolt N, which passes through a slot $c$ in the frame C. This frame is raised or lowered by means of a suitably-mounted eccentric shaft J, having a handle $j$, thus providing for moving the intermediate roll F below the plane of the meeting faces of the clamping-jaws A and B and also for adjusting the lower roll E relative to said plane, so as to suit different thicknesses of leather. The whole series of rolls is rotated by means of a crank $e'$, preferably fixed to the shaft of the idler $e$, as shown.

The upper roll G is mounted in a separate vertically-sliding frame D, which is carried upon a shaft K, mounted eccentrically in a top extension $B^2$ of the movable clamping-jaw B, with which it is carried up or down, while at the same time it is capable of independent movement by merely turning said eccentrically-mounted shaft by means of a suitable handle $k$. The purpose and effect of this arrangement will be further referred to hereinafter.

The clamping-jaw B, together with the roll G, carried thereby, as described, is operated, as shown, by two separate eccentric shafts H and H', provided with levers $h$ and $h'$, respectively, in a manner similar to that described in the prior patents already referred to. The turning of the eccentric shaft H', upon which the links M are carried, serves to raise or lower the latter, together with the second eccentric shaft H, which is mounted in the upper ends of these links and upon which the clamping-jaw B is carried, while the turning of this second eccentric shaft H serves to directly lower or raise said clamping-jaw B, the purpose of this double action being to provide increased clamping movement and power.

The fixed clamping-jaw on A, already described, is in my improved machine formed also with a second clamping-face $a'$, arranged at about a right angle to the main horizontal clamping-face $a$, and a separate jaw P, adapted to operate in connection with the face $a'$, is pivoted to lugs $A^2$ and operated by any suitable means, as screw P'. This additional clamping device is adapted particularly for use in squaring up the edge of the material as a preliminary operation to the inserting of the coil therein.

In connection with the main clamping-jaws I provide an improved device for effecting automatically a transverse movement of a portion of each convolution of the coil simultaneously with the flattening of the same, which operation has been heretofore effected by different mechanism, as described in Patent No. 581,316. In my present machine a portion of the clamp-face is formed by a separate piece B', Figs. 2, 5, 12, and 13, which is recessed into the jaw B, in which it has a limited movement between bottom stops $b^5$ $b^5$ and the top of the recess. Set into the latter at $b'$ $b'$ and also into the top of the movable face-piece B' at $b$ $b$ are loose links $b^2$ $b^2$ of equal length and set at equal angles. These links serve to insure a perfectly parallel movement of the face B' in the jaw B, similar to the movement of a parallel-ruler. A spring $b^4$ is provided to normally swing the face-piece B' into its lower position against the stops $b^5$ $b^5$, said spring being located, as shown, in a pocket formed in the end of the face-piece and bearing against a fixed pin $b^3$, entering said pocket.

In Fig. 11 is shown in detail one of the coil-rolls F. These rolls are grooved to engage the convolutions of the coil, as indicated at $f^3$. In order to stiffen the coil and secure more satisfactory penetration of the belt without interfering with the easy introduction of the coil to the action of the rolls, I form these grooves with a varying pitch, the coil entering end $f$ thereof having a pitch $f'$ which is greater than that $f^2$ on the remaining portion of the roll and corresponding practically with the normal pitch of the coil, which latter is thus readily screwed into the rolls a sufficient distance to be grasped and fed onward by the rotation of the rolls. I am thus enabled to readily enter the coil, and yet secure the advantage of stiffening the same by forcing it into a slightly-different pitch where the penetrating action is required.

The operation of my improved machine is in the main similar to those described in the prior patents mentioned and will be readily understood from the foregoing description. The edges of the belt or other material are conveniently squared while held in the clamping device P $a'$ preparatory to inserting the coil therein. When placed between the clamping-jaws A and B, the lower coil-roll E may be raised or lowered, so as to bring the center of the coil which is interposed between the three rolls E F G in the center line of the belt thickness, thus providing for proper insertion in belts of varying thickness. In closing the clamping-jaw B upon the belt the top roll G is carried down with it, so as to slightly compress the interposed coil between the three rolls E F G, the roll G being independently adjusted, if necessary, to suit the particular diameter of coil used and secure proper pressure of the rolls upon the latter, as well as proper clamping pressure upon the belt, regardless of varying diameter of coils and thicknesses of belts. After puncturing the belt and inserting the coil, as usual, the roll G and clamping-jaw B are simultaneously raised by merely operating the lever $h$ or $h'$, or both, thus releasing the belt. In flattening the inserted coil it is placed under the roughened or serrated jaw-face B', which as it is pressed down upon the coil is automatically moved transversely, while maintaining a perfectly parallel position, thus insuring equal action upon the coil throughout its length, the effect of this action being to slightly twist each convolution of the coil, so as to cause the overhanging portions to freely mesh with another similarly-treated coil, as has been more fully described in Patent No. 581,316.

In order to remove the roller E as an obstruction to the free passage of the belt through the machine, it is only necessary to lower it a short distance, as indicated in Fig. 1.

As it is obvious that the particular construction shown and described may be considerably varied and certain features thereof may be utilized without employing others, I do not desire to limit myself to such specific construction; but

What I claim is—

1. A wire-coil machine having a series of rolls arranged to close upon and rotate an interposed wire coil, clamping-jaws operating in connection therewith, mechanism for simultaneously closing said rolls and jaws, and mechanism for operating one independently of the other.

2. In a wire-coil machine, a series of three rolls arranged to engage an interposed wire coil and geared together to rotate in the same direction, two of said rolls and the two intermeshing idlers being in relatively-fixed positions and the third roll having a limited movement toward or away from said relatively-fixed rolls while remaining in gear with the latter.

3. In a wire-coil machine, the combination with a series of rolls arranged to close upon and rotate an interposed wire coil, of clamping-jaws having their meeting faces in the same horizontal plane with said interposed coil, the lower member thereof forming also one member of a second clamping device, and a third jaw forming the other member of the latter, said second clamping device operating substantially at right angles to the first.

4. In a wire-coil machine, a series of rolls arranged to close upon an interposed coil, and circular grooves to engage the convolutions of said coil, the pitch of said grooves at the receiving end of the rolls corresponding with the pitch of the coil so as to freely admit the latter, and the pitch on the main portion of the rolls being different from that at the end so as to give additional stiffness to the coil as it is being rotated and traversed by the rolls.

5. A wire-coil machine having a series of three rolls triangularly arranged and adapted to close upon and rotate an interposed wire coil, clamping-jaws having their meeting faces in the same horizontal plane with one of said rolls, and means for sliding said roll out of said plane.

6. A wire-coil machine having a series of three rolls triangularly arranged and adapted to close upon and rotate an interposed wire coil, clamping-jaws having their meeting faces in a horizontal plane between the top and bottom rolls, and separate means for adjusting said top and bottom rolls.

7. A wire-coil machine having a series of three rolls triangularly arranged and adapted to close upon and rotate an interposed wire coil, clamping-jaws having their meeting faces in the same horizontal plane with one of said rolls, and means for vertically adjusting said roll and the lower one of the two rolls.

8. A wire-coil machine having clamping-jaws adapted to engage and flatten the convolutions of the coil, one of said jaws having a separately-formed face with a swinging connection whereby a positively-parallel transverse movement of said face is produced by the closing of the jaws.

9. A wire-coil machine having clamping-jaws adapted to engage and flatten the convolutions of the coil, one of said jaws having a separately-formed face with a swinging connection whereby a positively-parallel transverse movement of said face is produced by the closing of the jaws, a spring to return the same, and a stop.

Signed by me, at Reading, Berks county, Pennsylvania, this 19th day of February, 1898.

JOSEPH H. TEMPLIN.

Witnesses:
F. PIERCE HUMMEL,
W. G. STEWART.